Feb. 19, 1963  A. E. BISHOP  3,077,705
APPARATUS FOR MAKING VARIABLE LEAD
HOURGLASS STEERING GEAR WORMS
Filed June 13, 1958  3 Sheets-Sheet 1

Inventor
Arthur E. Bishop

Inventor
Arthur E. Bishop

United States Patent Office 3,077,705
Patented Feb. 19, 1963

3,077,705
APPARATUS FOR MAKING VARIABLE LEAD
HOURGLASS STEERING GEAR WORMS
Arthur E. Bishop, Bloomfield Township, Oakland County,
Mich. (5516 Westwood Lane, Birmingham, Mich.)
Filed June 13, 1958, Ser. No. 741,894
4 Claims. (Cl. 51—97)

The present invention relates to a novel apparatus for the manufacture of steering gear worms. More particularly, the invention is concerned with the manufacture of steering gear worms of the so-called hourglass configuration.

The manufacture of automotive power steering systems or the like in which a variable steering ratio is achieved has posed a serious problem in manufacturing technique. Various structural means have been employed for providing variable ratio in automotive steering systems and these means have been fully set forth in various of my prior copending United States patent applications and issued United States patents. One of the most compact and accordingly one of the commercially more desirable forms of variable ratio mechanisms is that illustrated in my copending application Serial No. 657,570 filed May 7, 1957, now Patent No. 2,865,218, dated December 23, 1958 employing a helical worm having an hourglass configuration and a variable lead worm track co-operating with a double roller worm follower. A helical cam track variable lead worm arrangement is also shown in my copending application Serial No. 511,541 filed May 27, 1955, now Patent No. 2,865,217, dated December 23, 1958. In the latter application, a single roller cam follower is employed with a helical cam track, which cam track may be either of the hourglass or straight configuration within the disclosure of that application. The actual construction of a variable lead cam track acceptable for use in a variable ratio steering gear of the hourglass worm type posed serious problems and was first successfully accomplished through the employment of the apparatus of the present invention.

In accordance with the principles of the present invention, a worm blank, in which a variable pitch helical cam track is to be cut, is mounted for rotation about its own axis on a yoke bracket which is in turn pivotally mounted about an axis corresponding to the axis of rotation of the follower ultimately to be employed with the finished worm. The follower pivot axis is generally transverse to the axis of rotation of the worm itself and in the preferred form of steering gear structure the follower carries one or more rollers which actually engage the cam track of the worm and which are preferably mounted for rotation about an axis generally, though not absolutely, parallel to the axis of rotation of the worm.

In the apparatus here employed, a cutting tool is advanced transversely into the periphery of the worm blank in a path normal to the axis of rotation of the worm. Upon advancement of the cutting tool to a depth consonant with good machining practice, the worm is rotated and simultaneously is pivoted about the axis of the worm holding yoke bracket thereby causing the worm to move peripherally, arcuately, across the face of the cutting tool. Variable pitch is imparted to the helical cam track by varying the speed of peripheral movement or, in other words, the angular velocity of pivoting motion of the bracket carrying the worm, in its movement across the cutting tool. In accordance with the present invention the movements of the worm relative to the cutter are precisely controlled by a positively driven master cam. By modifying the contours of the master cam as hereinafter more fully set forth, the specific contour of the worm may simply and extremely accurately be modified to vary the control characteristics of the cam track when used with a single roller cam follower and, also, by merely modifying the master cam the apparatus may be employed for the manufacture of hourglass worms for co-operation with multiple roller followers.

It is, accordingly, an object of the present invention to provide a novel apparatus for manufacturing hourglass worms or the like.

A further object of the invention is to provide a novel and exceptionally simple apparatus for manufacture variable lead hourglass worms.

Still a further object of the invention is to provide an apparatus for manufacturing variable pitch hourglass worms capable of utilization with substantially any worm cam track configuration desired.

Still a further object of the present invention is to provide a novel apparatus for manufacture helical cam track hourglass worms.

Still a further object of the invention is to provide an improved apparatus for manufacturing a substantially infinite number of variations of hourglass worm cam tracks in a simple manner and employing only a single modified part with each variation.

Another object of the present invention is to provide an apparatus capable of either rough or finish machining a variable pitch hourglass worm sequentially and without modification of the apparatus.

Still other and further objects and features of the present invention will at once become apparent to those skilled in the art from a consideration of the attached drawings wherein two embodiments of the invention are shown by way of illustration only and wherein.

As shown on the drawings.

Figure 1:
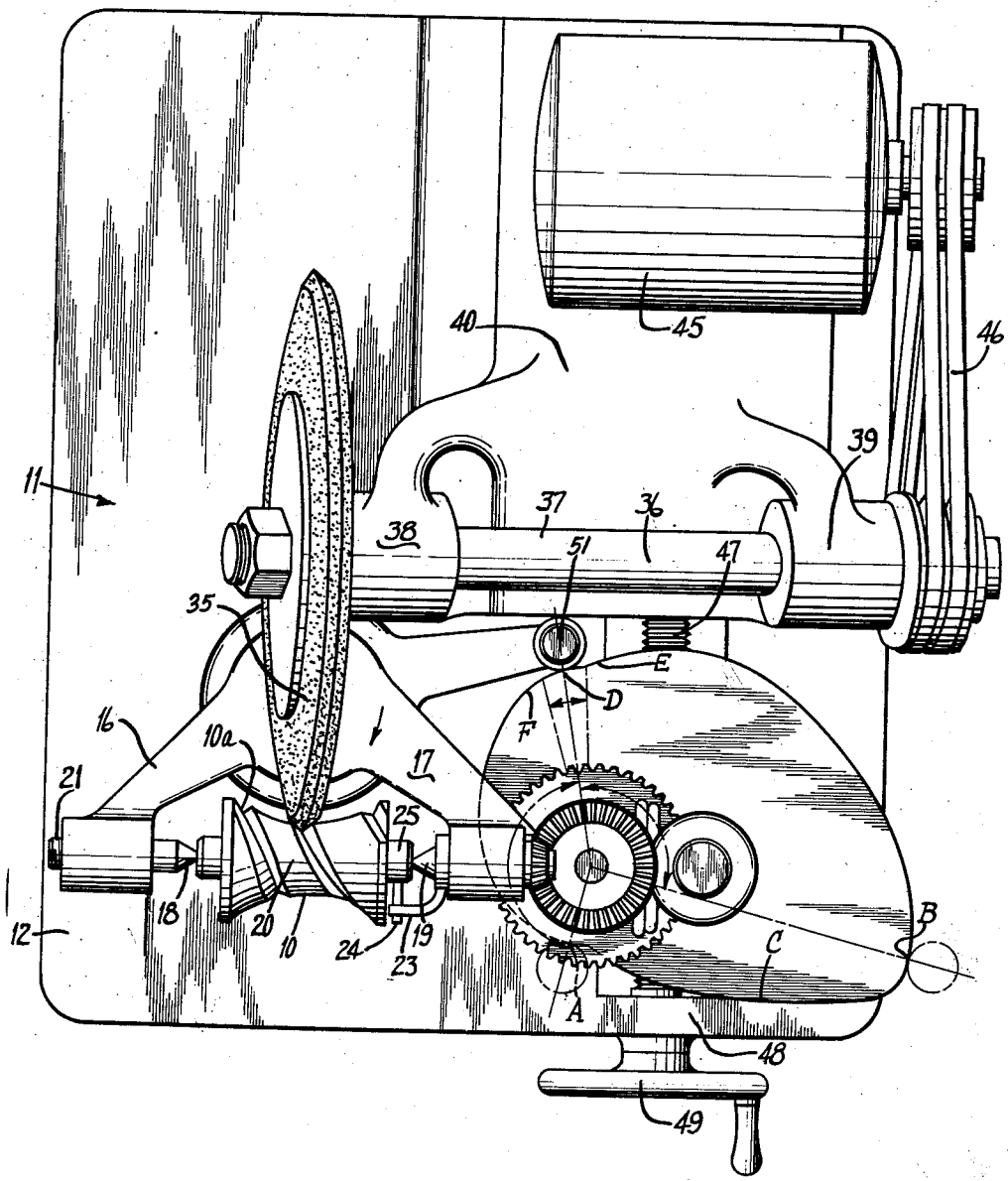
FIGURE 1 is a plan view of an apparatus constructed in accordance with the principles of the present invention.
Figure 2:
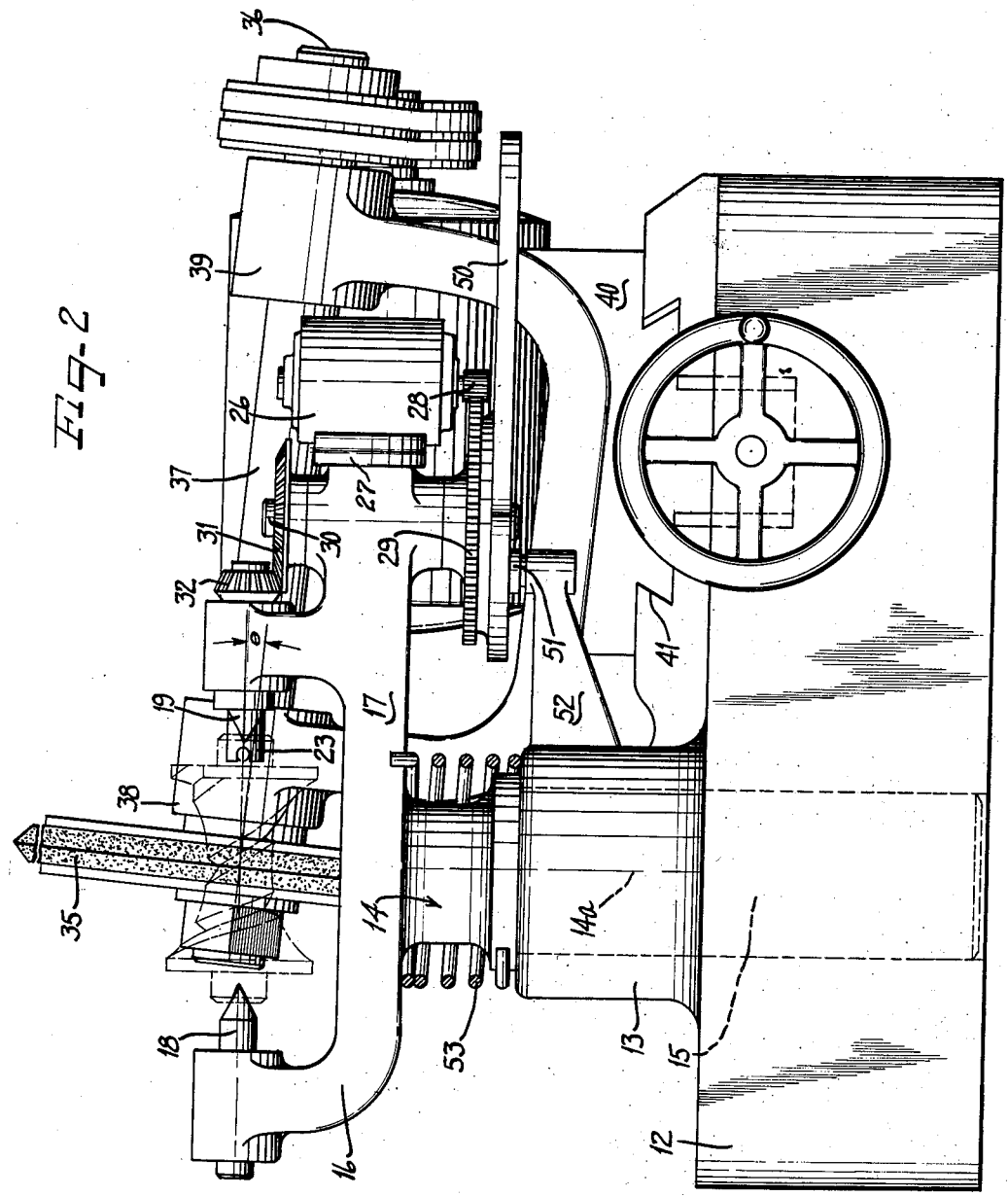
FIGURE 2 is a side elevational view of the apparatus shown in FIGURE 1.
Figure 3:
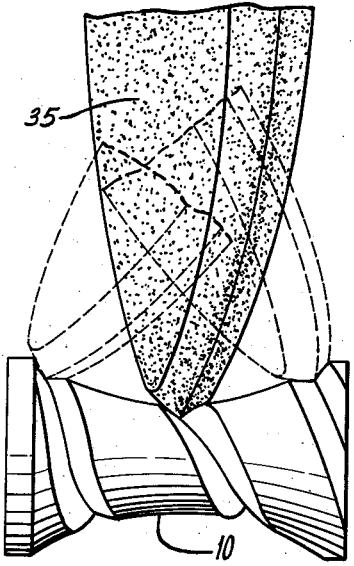
FIGURE 3 is a view illustrative of the movement of the worm relative to the cutting tool.

As may be seen from a consideration of FIGURES 1 and 2, a worm 10 of the hourglass configuration is mounted in an apparatus generally indicated at 11. The worm 10 is, as above noted, of hourglass form, which form is, broadly, well known in the art. An example of the incorporation of such a worm into a steering apparatus is fully illustrated in my Patent No. 2,865,218, above-mentioned, it being understood, however, that no limitation to such a specific system is intended. The identified Patent No. 2,865,218 may also be referred to for a description of the modus operandi of a power steering system typical of those in connection with which the worm manufactured in accordance with the principles of the present invention may be conveniently used.

In the embodiment of the invention illustrated, the apparatus for manufacturing the cam track of a helical worm comprises a rigid base 12 having an upstanding rigid trunnion 13 pivotally carrying a yoke or bracket member 14. The yoke 14 is provided with a stub shaft extension 15 rotatably mounted in the trunnion 13 and comprises a pair of spaced yoke arms 16, 17. The respective arms 16 and 17 are provided with conical centers 18 and 19 respectively for centering the worm 10 on an axis of rotation 20. The worm 10 is firmly held on the centers 18 and 19 by adjusting the centers axially toward each other in any conventional manner, such as for example the threads 21 on the center 18.

Rotational power is applied to the worm 10 by means of a dog 23 secured to the center 19 and adapted for co-operation with a pin 24 rigidly secured to the arbor 25 supporting the worm 10. In the embodiment illustrated, the arbor 25 is a part separate from the worm and keyed thereto by means of a splined connection employing the internally facing splines of the worm. It will be obvious, of course, that the dog 23 may co-operate directly with the worm via a notch in the end face thereof, if desired.

The dog 23 is rotated, along with the center 19, by means of a power source directly mounted on the arm 17. This may readily be seen from a consideration of FIGURE 2. As there shown, a motor 26 is rigidly mounted on an extension 27 of the yoke arm 17. The output gear 28 of the motor directly drives a spur gear 29 drivingly splined in any conventional manner to a shaft 30 which in turn is drivingly connected to the bevel pinion 31 co-operating with pinion 32 on the center 19. As a result of this drive connection, rotation of the motor 26 directly drives the worm independently of the position of the yoke 14 relative to the housing 12.

In the embodiment of the apparatus illustrated, the cutting tool employed for cutting the helical cam track in the hourglass worm 10 comprises a large diameter grinding wheel 35 mounted for rotation about a fixed axis 36. Drive power is applied to the grinding wheel 35 via shaft 37 supported in bearings 38 and 39 rigidly carried by a slide 40 mounted in guideway 41 on the frame or housing 12. The slide 40 carries a motor 45 rigidly mounted thereon and drive is taken from the motor 45 to the shaft 37 by means of a V-belt connection 46.

The axis 36 of the wheel 35 is in the same general horizontal plane as the axis of rotation of the roller of the cam follower ultimately to be employed with the worm 10 and is positioned parallel to such ultimate axis. The angle of deflection between the axis 36 and the true horizontal (angle $\theta$) is preferably a compromise angle between the maximum and minimum lead angles of the variable lead worm being cut.

In actual practice, the diameter of the roller to be associated with the worm is substantially less than half of the diameter of the grinding wheel shown and, accordingly, the axis of rotation of the wheel 35 must be moved transversely away from the worm by an amount equal to the difference between the radius of the roller for which the worm is intended and the radius of the grinding wheel 35. The dimension thus established may be varied by means of a lead screw 47 carried by a mounting collar 48 for rotational movement by handwheel 49. The lead screw 47 is convenionally threaded into the end of the slide 40. As a result of this arrangement, the wheel 35 may be moved increasingly toward the axis of rotation of the worm 10 to provide for progressively deeper cuts or for disengagement from the work entirely.

It will be immediately seen that as thus far described, the motor 26 and the motor 45 provide a power combination that would, if employed without further mechanism, be capable of grinding only an annular groove in the worm 10. A helical groove or cam track may be provided by rotating the yoke 14 about its pivot axis 14a while the worm is rotating and the grinding wheel 35 is likewise rotating. It is desired that the worm and yoke be timed to rotate in a predetermined ratio, preferably an even ratio on the order of 3 turns of the worm to 1 turn of the yoke. This is accomplished in the embodiment illustrated, by the provision of a master cam 50 fixedly secured by any conventional means, such as a key or spline, to the gear 29. The cam 50 is thus directly timed relative to the rotation of the dog 23 through the pinions 31 and 32. As shown, the worm is in its midpoint position relative to the grinding wheel 35, in FIGURE 1, and approximately one and one-eighth rotations of the worm in either direction will bring the grinding wheel 35, or the roller follower, in the final steering assembly, to the end of the track. Thus, in the arrangement shown, it would be desired that approximately two and one-quarter turns of the worm be accomplished during the time in which the worm is moved about the pivot 14a from one end to the other of the cam groove. The master cam 50 is accordingly constructed to provide three-quarters turn of the cam during two and one-quarter revolutions of the dog 23. By providing an even gear ratio continuous successive passes of the grinding wheel 35 is permitted without complex indexing mechanism.

The master cam 50 co-operates with the roller 51 which is pivotally secured to the housing 12 by means of arm 52 secured to the trunnion 13. Biasing means are provided for urging the yoke in a counterclockwise direction as viewed in FIGURE 1. The biasing means in the form illustrated comprises a spring 53 secured at its opposite ends to the yoke 14 and the trunnion 13 for biasing the surface of the cam 50 into positive engagement with the roller 51. Thus, as the cam 50 rotates in the counterclockwise direction as viewed in FIGURE 1, the worm 10 will rotate in the clockwise direction as viewed from the righthand end in FIGURE 1 and at the same time the yoke 14 rotates in the clockwise direction as a result of the reaction of the cam 50 against the pin or roller 51. In the position of the parts shown in FIGURE 1, the roller 51 is engaged with the mid-operative point or portion of the master cam 50. This midpoint of the cam is, in the embodiment shown, 135° from the extreme operative position A in the counterclockwise direction and is similarly 135° from the extreme operative position B in the clockwise direction. The 45° remaining in the circumference of the cam 50 is employed to provide a return surface C in which the worm is moved backwardly in the counterclockwise direction to start a new pass. During this period in the cycle, the grinding wheel 35 is moved on the slide 40 away from the worm and is then fed in the direction of the worm immediately prior to engagement therewith on the next cycle of the cam 50.

The cam 50 can, of course, be constructed to provide a constant lead worm by providing the surface thereof with a constant increase of radius as the cam 50 rotates by counterclockwise direction. With such a constant rate of increase, the worm 10 will move across the face of the grinding wheel 35 in a constant manner. To provide a variable pitch or lead to the cam track 10a of the worm 10, the yoke 14 must be rotated by the cam at a variable rate of speed. This is accomplished by providing a non-constant increase in the lift or radius of the cam 50. In the embodiment shown in FIGURE 1, in which it is desired that a single roller cam follower be employed with the hourglass worm, it is desired that a low lead be provided at the central position. This is accomplished by slowing down the amount of pivotal rotation of the yoke 14 as the worm 10 continues to rotate at the predetermined constant speed. In accordance with the present invention this may be accomplished by rapidly reducing the rate of increase in lift of cam 50 adjacent the midpoint of its operative engagement with the roller 51 to a minimum low rate of lift. Such a minimum low rate of increasing lift is shown at the portion D. The minimum rate of increased lift is immediately followed by a rapid rate of lift increase at the portion E of the cam 50 and was immediately preceded by a portion of rapidly decreasing rate of lift F. By such a configuration, a relatively high lead may be provided at the extreme ends of the cam track 10a with a rapid decrease in lead adjacent the centered condition of a minimum lead, which, of course, comprises the neutral or vehicle-straight-ahead condition in the steering system.

Figure 4:
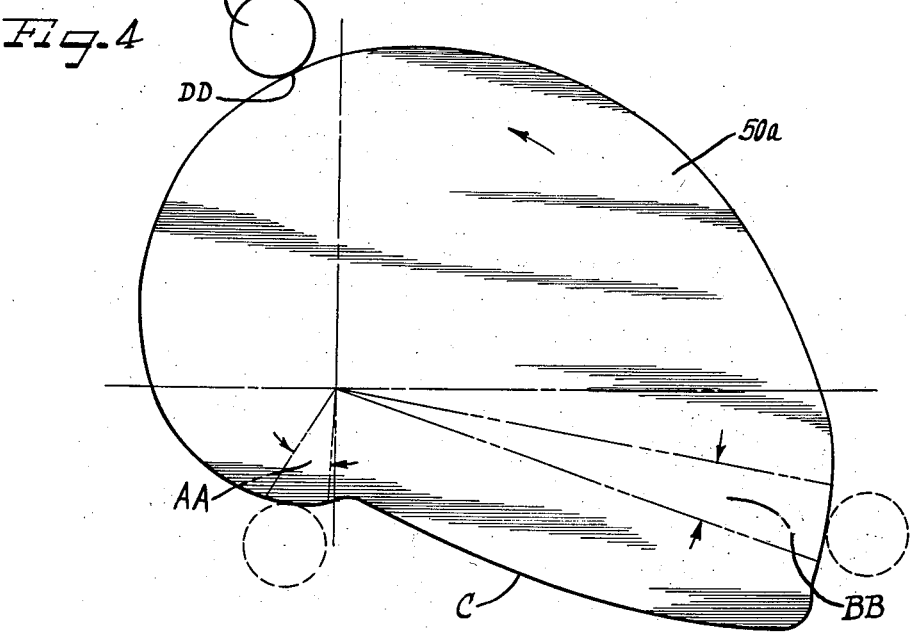
FIGURE 4 is a plan view of a modified form of master cam constructed in accordance with the present invention.

In the embodiment of the cam illustrated in FIGURE 4, it is intended that the worm be employed in a steering system such as shown in my above-identified Patent No. 2,865,218 wherein a dual roller cam follower is provided. In such a case, as fully set forth in said Patent No. 2,865,218, the hourglass worm is provided with cam track portions having a low lead or high pitch at the ends of the track instead of at the midpoint. Accordingly, to provide such a track, the master cam must necessarily be provided with points of low rates of increasing lift at the ends of the operative surfaces AA and BB, increasing to a maximum rate of lift at the point DD as the cam 50a rotates in the clockwise direction and subsequently decreasing rapidly in the rate of increase to the area BB of minimum increase in rate of change.

From the above, it will be seen that master cams may be provided for very accurately modifying the exact configuration of the cam track 10a in the worm 10. The large surface of the cam 50 permits very minute changes in lead to be applied to the cam track without extremely intricate manipulation of the grinding wheel 35 itself. By making the connection between the master cam 50 and the gear 29 detachable, a large number of master cams 50 may be employed for experimental purposes or for providing a multitude of differently tailored steering gear variations. By using a configuration of the grinding wheel slightly different from that of the roller surface ultimately to be used with the cam track and by varying the rate of lift of cam 50 to compensate therefor, preloaded fit between the roller and worm may readily be accomplished.

It is considered preferable to provide an apparatus capable of either rough or finish machining the cam track 10a. Accordingly, it is desired that the grinding wheel 35 be employed. In grinding apparatus it is, of course, desired that large diameter grinding wheels be employed to permit high peripheral grinding speeds. The arrangement shown permits the employment of a grinding wheel substantially larger in diameter than the roller ultimately to be used with the worm. Since the grinding wheel is actually pivoted about an axis 14a, about which the cam follower ultimately rotates. It has been found that the slight interference caused by utilizing a large diameter grinding wheel than the ultimate cam follower roller is insufficiently important to cause noticeable inaccuracies in operation. The utilization of the large diameter wheels also permits the positioning of the grinding wheel drive in a convenient manner away from the cam 50.

As described above, the axis 14a of pivotal movement of the worm relative to the cutting member corresponds in position to the axis of rotation of the cross or pivot shaft of the worm follower ultimately to be employed in the steering gear. This correspondence need not be exact. In actual manufacturing practice it is ordinarily desired that the worm follower fit more snugly with the worm cam track in the midpoint, vehicle-straight-ahead condition and accordingly in grinding the cam track this may be provided for by slight deviation from exact axis correspondence. For example, where a single roller cam follower is employed, the distance between the axis 14a and the axis 20 may be very slightly greater than the distance between the cross shaft and worm in the final steering gear to thereby provide slight looseness of fit as the parts move away from the vehicle-straight-ahead or midpoint condition. In the case of a double roller follower, the distance from axis 14a to 20 would be very slightly less than the ultimate cross shaft to worm axis distance to provide similar looseness as the steering gear parts move away from the straight-ahead condition.

While a spring has been illustrated as the means for biasing the yoke 14 against the roller 51, it will be understood that other means may be employed for this purpose.

It will be apparent from a consideration of the above description and drawings that I have provided a novel and very effective apparatus for cutting a predetermined cam track in a worm member, as well as an improved method of manufacturing hourglass worms. Since it is clear that variations and modifications may be made in the structure hereinabove set forth, without departing from the scope of the novel concepts of the present invention, it is my intention that the invention be limited solely by the scope of the hereinafter appended claims.

I claim as my invention:

1. Apparatus for cutting a helical cam track in a worm member adapted for rotational co-operation with a follower member pivotal about an axis transverse to the axis of rotation of the worm member, comprising a rigid base, first yoke means mounted pivotally on said base and having means for supporting said worm member for rotation about its longitudinal axis, the pivot axis for said yoke means extending transversely of and being spaced from the axis of rotation of said worm member mounted in said yoke means, the axis of the worm member and the axis of the yoke means being at approximately right angles relative to each other, drive mechanism carried by said yoke means independently of said base for rotating said worm member about its longitudinal axis, a cutting member, second means supporting said cutting member for cutting engagement with the periphery of said worm member, and third means directly geared to said drive mechanism for rotating said yoke means relative to said base about the pivot axis of the yoke means at a changing angular velocity simultaneously with rotation of the worm member about its longitudinal axis whereby said cutting member cuts a variable lead helical cam track in the periphery of said worm member.

2. Apparatus for cutting a helical cam track in a worm member adapted for rotational co-operation with a follower member pivotal about an axis transverse to the axis of rotation of the worm member comprising, a rigid base, first yoke means mounted pivotally on said base and having means for supporting said worm member for rotation about its longitudinal axis, the pivot axis for said yoke means extending transversely of and being spaced from the axis of rotation of said worm member mounted in said yoke means, the axis of the worm member and the axis of the yoke means being at approximately right angles relative to each other, drive mechanism carried by said yoke means independently of said base for rotating said worm member about its axis of rotation, a cutting member, second means supporting said cutting member for cutting engagement with the periphery of said worm member, and third means directly geared to said drive mechanism for rotating said yoke means relative to said base about its pivot axis at a varying angular velocity simultaneously with rotation of the worm member about its axis of rotation whereby said cutting member cuts a changing lead helical cam track in the periphery of said worm member, said last named means comprising a cam mounted on said yoke means and rotatable relative thereto and a cam reaction member rigidly secured relative to said base for contact with said cam whereby rotation of said cam against said reaction member forces said yoke means to pivot about its pivotal axis.

3. Apparatus for cutting a helical cam track in a worm member adapted for rotational co-operation with a follower member pivotal about an axis of transverse to the axis of rotation of the worm member comprising, a rigid base, first yoke means mounted pivotally on said base and having means for supporting said worm member for rotation about its longitudinal axis, the pivot axis for said yoke means extending transversely of and being spaced from the longitudinal axis of said worm member mounted in said yoke means, the axis of said worm member and the axis of said yoke means being at approximately right angles relative to each other, drive mechanism carried by said yoke means independently of said base for rotating said worm member about its longitudinal axis, a cutting member, second means supporting said cutting member for cutting engagement with the periphery of said worm member, and third means directly geared to said drive mechanism for rotating said yoke means relative to said base about its pivot axis at a varying angular velocity simultaneously with rotation of the worm member about its axis of rotation whereby said cutting member cuts a changing lead helical cam track in the periphery of said worm member, said last named means comprising a cam mounted on said yoke means and rotatable relative thereto and a cam reaction member rigidly secured relative to said base for contact with said cam whereby rotation of said cam against said reaction member forces said yoke means to pivot about its pivotal axis, said geared connection between said third means and said drive mechanism providing less than one rotation of said cam during rotation of said worm through the number of turns thereof providing extreme rotation when in co-operation with said follower member.

4. Apparatus for cutting a helical cam track in a worm member adapted for rotational co-operation with a follower member pivotal about an axis transverse to the axis of rotation of the worm member comprising, a rigid base, first yoke means mounted pivotally on said base and having means for supporting said worm member for rotation about its longitudinal axis, the pivot axis for said yoke means extending transversely of and being spaced from the longitudinal axis of said worm member in said yoke means, the axis of the worm member and the axis of the yoke means being at approximately right angles relative to each other, drive mechanism carried by said yoke means independently of said base for rotating said worm member about its longitudinal axis, a cutting member, second means supporting said cutting member for cutting engagement with the periphery of said worm member, and third means directly geared to said drive mechanism for rotating said yoke means relative to said base about its pivot axis at a varying angular velocity simultaneously with rotation of the worm member about its longitudinal axis whereby said cutting member cuts a variable lead helical cam track in the periphery of said worm member, said last named means comprising a cam mounted on said yoke means and rotatable relative thereto and a cam reaction member rigidly secured relative to said base for contact with said cam whereby rotation of said cam against said reaction member forces said yoke means to pivot about its pivotal axis, said cam having a continuously increasing radius throughout its cycle of operative contact with said reaction member and having a varying rate of increase whereby the pivotal movement of said worm member relative to the cutting member increases in velocity when said rate is increased and decreases in velocity as said rate is decreased to provide, respectively, increasing and decreasing lead portions in said cam track.

References Cited in the file of this patent

UNITED STATES PATENTS

| | | |
|---|---|---|
| 918,770 | Sachs | Apr. 20, 1909 |
| 1,306,400 | Barr | June 10, 1919 |
| 1,960,460 | Schurr | May 29, 1934 |
| 2,011,956 | Trbojevich | Aug. 20, 1935 |
| 2,142,285 | Pelphrey | Jan. 3, 1939 |
| 2,154,055 | Schurr | Apr. 11, 1939 |
| 2,224,817 | Hawgood | Dec. 10, 1940 |